W. H. SEABROOK, Jr.
EYEGLASSES.
APPLICATION FILED MAY 4, 1917.
1,260,073.
Patented Mar. 19, 1918.
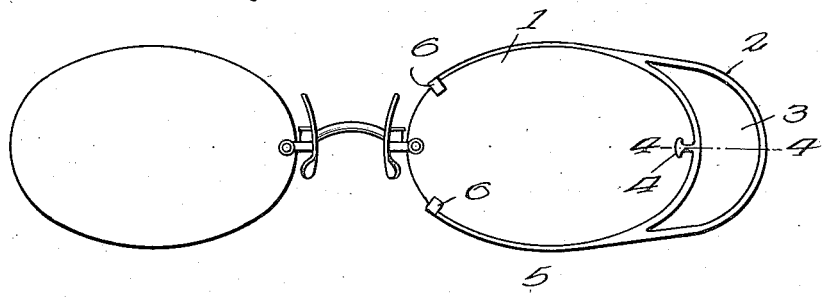
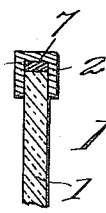
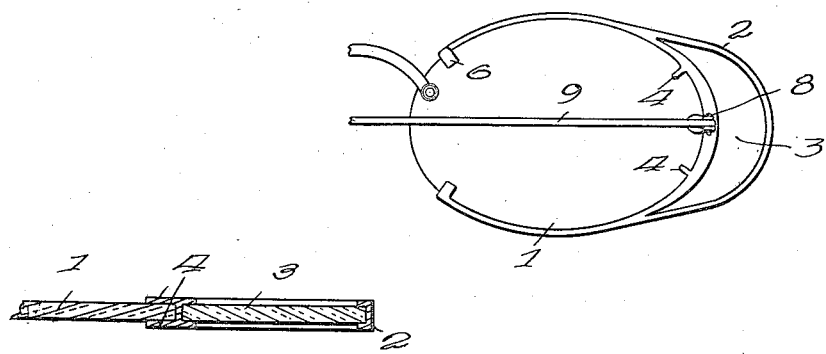
W. H. Seabrook Jr.
Inventor
By Geo. Kimmel
Attorney

UNITED STATES PATENT OFFICE.

WILLIAM H. SEABROOK, JR., OF SAVANNAH, GEORGIA.

EYEGLASSES.

1,260,073.

Specification of Letters Patent.

Patented Mar. 19, 1918.

Application filed May 4, 1917. Serial No. 166,429.

*To all whom it may concern:*

Be it known that I, WILLIAM H. SEABROOK, Jr., a citizen of the United States, and resident of Savannah, in the county of Chatham and State of Georgia, have invented certain new and useful Improvements in Eyeglasses, of which the following is a specification.

This invention relates to eye-glasses and it is the dominant object of the invention to provide a novel mirror attachment therefor whereby the wearer will be enabled to see objects in the rear without the necessity of turning his head.

Another object of the invention is to provide a mirror attachment which can be engaged with the conventional type of eyeglasses without alteration thereto and when desired, can be easily and instantly removed therefrom.

The improvements in the details and arrangement of parts will be apparent from an inspection of the accompanying drawings, in connection with the specific description hereinafter contained, and wherein the preferred embodiment of the invention is shown for the purpose of imparting a full understanding of the same.

In the drawings:

Figure 1 is a front elevation of a pair of eye-glasses with my improved mirror attachment applied thereto;

Fig. 2 is a fragmentary cross sectional view through one of the eye-glass lenses showing the pair of spaced ears.

Fig. 3 is a detail in side elevation of a lens with a slightly modified form of mirror attached thereto; and Fig. 4 is a horizontal section taken on the line 4—4 of Fig. 1.

Referring more specifically to the drawings wherein like reference characters designate corresponding parts in the several views, it will be noted that I have shown my improved mirror attachment as applied to the conventional type of nose glasses designated by the numeral 1, the said attachment including a curved frame 2 formed of channeled metal whereby a mirror 3 may be arranged therein. Upon the inner side of the frame oppositely disposed fingers 4 are formed while upon the opposite ends thereof spring arms 5 are arranged and have their free ends provided with right angularly disposed ears 6, it being understood that the said fingers and ears engage the adjacent side of the particular lens to which the frame is attached, thereby maintaining the same in proper position upon the outer marginal edge thereof. To prevent movement of the spring arms 5 longitudinally of the eye-glass lens, the same are preferably curved to conform to the contour of the lens, while rubber inserts 7 are arranged in their free ends adjacent the spaced ears 6.

In the Fig. 3 I have shown the mirror attachment as applied to the conventional type of eye-glasses employing hinged temples and in this particular form, the inner side of the frame 2 is notched or recessed as at 8 to receive the hinged joint of the temple 9 therein.

From the foregoing, it will be appreciated by workers in the art, that with my improved mirror attachment the user will be enabled to readily and plainly see objects in the rear of him without the necessity of turning his head, thus, rendering the same especially desirable for operators of motor vehicles and the like. Further, it will be understood that the attachment may be readily applied to the ordinary form of sun glasses commonly used by drivers of vehicles.

Manifestly, the construction shown is capable of considerable modification, and such modification as is within the scope of my claims, I consider within the spirit of my invention.

I claim:

1. An eye-glass attachment comprising a frame formed of channeled metal and having a plurality of spring arms extending therefrom, and a mirror carried by the frame.

2. An eye-glass attachment comprising a frame formed of channeled metal, a plurality of curved spring arms extending from the opposite ends of said frame and having spaced ears formed upon their free ends, and a mirror carried by the frame.

3. An eye-glass attachment comprising a frame formed of channeled metal and curved to conform to the contour of an eye-glass lens, curved spring arms extending from the opposite ends of said frame, spaced fingers formed upon the inner side of the frame, and a mirror carried by the frame.

4. An eye-glass attachment comprising a frame formed of channeled metal having a plurality of spring arms extending therefrom, rubber inserts in said arms adjacent the extremities thereof, and a mirror carried by the frame.

In testimony whereof, I affix my signature hereto.

WILLIAM H. SEABROOK, Jr.